United States Patent [19]

Fujiwara et al.

[11] Patent Number: 4,606,423
[45] Date of Patent: Aug. 19, 1986

[54] CONTROL APPARATUS FOR POWER-ASSISTED STEERING SYSTEM

[75] Inventors: Hidetoshi Fujiwara; Tetsushi Kawamura, both of Okazaki, Japan

[73] Assignees: Toyota Jidosha Kabushiki Kaisha, Toyota; Toyoda Koki Kabushiki Kaisha, Kariya, both of Japan

[21] Appl. No.: 657,408

[22] Filed: Oct. 3, 1984

[30] Foreign Application Priority Data

Oct. 3, 1983 [JP] Japan ................... 58-185539

[51] Int. Cl.⁴ .................... B62D 5/04; B62D 5/06
[52] U.S. Cl. ........................ 180/79.1; 180/141
[58] Field of Search ............ 180/79.1, 141, 142, 180/143; 60/452, 450; 74/388 PS; 301/236

[56] References Cited

U.S. PATENT DOCUMENTS

| | | | |
|---|---|---|---|
| 3,915,253 | 10/1975 | Ott et al. | 180/141 |
| 3,952,510 | 4/1976 | Peterson | 180/141 |
| 3,983,953 | 10/1976 | Boyle | 180/79.1 |
| 4,345,661 | 8/1982 | Nishikawa | 180/141 |
| 4,418,779 | 12/1983 | Nakayama et al. | 180/141 |
| 4,471,280 | 9/1984 | Stack | 180/79.1 |
| 4,473,128 | 9/1984 | Nakayama et al. | 180/79.1 |

FOREIGN PATENT DOCUMENTS

2834283 2/1979 Fed. Rep. of Germany ...... 180/142

Primary Examiner—Raymond A. Nelli
Attorney, Agent, or Firm—Oblon, Fisher, Spivak, McClelland & Maier

[57] ABSTRACT

In a power-assisted steering system including a steering shaft arranged to be rotated by steering effort applied thereto, a fluid pump driven by a prime mover of the vehicle, a hydraulic cylinder having a power piston mounted for reciprocating movement in the cylinder and operatively connected to driven members of the steering system, and a servo valve interconnecting the fluid pump and the cylinder and being responsive to rotary motion of the steering shaft for selectively directing the flow of fluid under pressure from the pump to one of opposite fluid chambers of the cylinder and permitting the flow of fluid from the other fluid chamber to a fluid reservoir to effect reciprocating movement of the power piston, an electrically operated control valve of the normally closed type is disposed within a bypass passage between the opposite fluid chambers of the cylinder to permit the flow of fluid passing through the bypass passage in its energized condition so as to restrain rapid increase of the pump load during maneuvers of the vehicle. The control valve is arranged to be energized when the power piston approaches to its stroke end.

4 Claims, 5 Drawing Figures ical steering system for use in wheeled vehicles and more particularly to a control apparatus for the power-assisted steering system which includes a steering shaft arranged to be rotated by steering effort applied thereto, a source of fluid under pressure in the form of a fluid pump driven by a prime mover of the vehicle, a hydraulic cylinder having a power piston mounted for reciprocating movement in the cylinder and operatively connected to driven members of the steering system, and a servo valve interconnecting the fluid pump and the cylinder and responsive to rotary motion of the steering shaft for selectively directing the flow of fluid under pressure from the pump to opposite fluid chambers of the cylinder to effect reciprocating movement of the power piston.

CONTROL APPARATUS FOR POWER-ASSISTED STEERING SYSTEM

BACKGROUND OF THE INVENTION

The present invention relates to a power-assisted steering system for use in wheeled vehicles and more particularly to a control apparatus for the power-assisted steering system which includes a steering shaft arranged to be rotated by steering effort applied thereto, a source of fluid under pressure in the form of a fluid pump driven by a prime mover of the vehicle, a hydraulic cylinder having a power piston mounted for reciprocating movement in the cylinder and operatively connected to driven members of the steering system, and a servo valve interconnecting the fluid pump and the cylinder and responsive to rotary motion of the steering shaft for selectively directing the flow of fluid under pressure from the pump to opposite fluid chambers of the cylinder to effect reciprocating movement of the power piston.

In such a conventional power-assisted steering system as described above, the pressure of fluid discharged from the pump varies in accordance with resistance acting on the steerable road-engaging wheels of the vehicle. When the steering shaft is rotated to its rotary end to move the power piston to its stroke end, the pump load rapidly increases to increase the fluid pressure up to a relief pressure. Under such a condition, it has been experienced that the prime mover becomes unstable in its operation or suddenly stops due to rapid increase of the pump load.

SUMMARY OF THE INVENTION

It is, therefore, a primary object of the present invention to provide a control apparatus for the power-assisted steering system capable of avoiding unexpected trouble of the prime mover caused by rapid increase of the pump load during turning maneuvers of the vehicle.

According to the present invention, the primary object is accomplished by providing a control apparatus for the power-assisted steering system which comprises an electrically operated control valve of the normally closed type disposed within a bypass passage for providing bypass flow of fluid passing therethrough from the fluid pump to the fluid reservoir in its energized condition, detecting means for detecting the reciprocating movement of the power piston to produce an output signal indicative of moving stroke of the power piston, means responsive to the output signal from the detecting means for producing a control signal when a value of the output signal reaches a predetermined value indicative of approach of the power piston to its stroke end, and means for energizing the control valve in response to the control signal in such a way to increase the opening degree of the control valve in accordance with the value of the control signal.

In operation of the control apparatus, the control valve is energized in response to the control signal when the power piston approaches to its stroke end during maneuvers of the vehicle. This establishes the bypass flow of fluid from the fluid pump to the fluid reservoir to restrain rapid increase of the pump load so as to ensure stable operation of the prime mover.

BRIEF DESCRIPTION OF THE DRAWINGS

Additional objects and advantages of the present invention will become readily apparent from the following detailed description of a preferred embodiment thereof when taken together with the accompanying drawings, in which.

DETAILED DESCRIPTION OF THE PREFERRED EMBODIMENT

Figure 1:
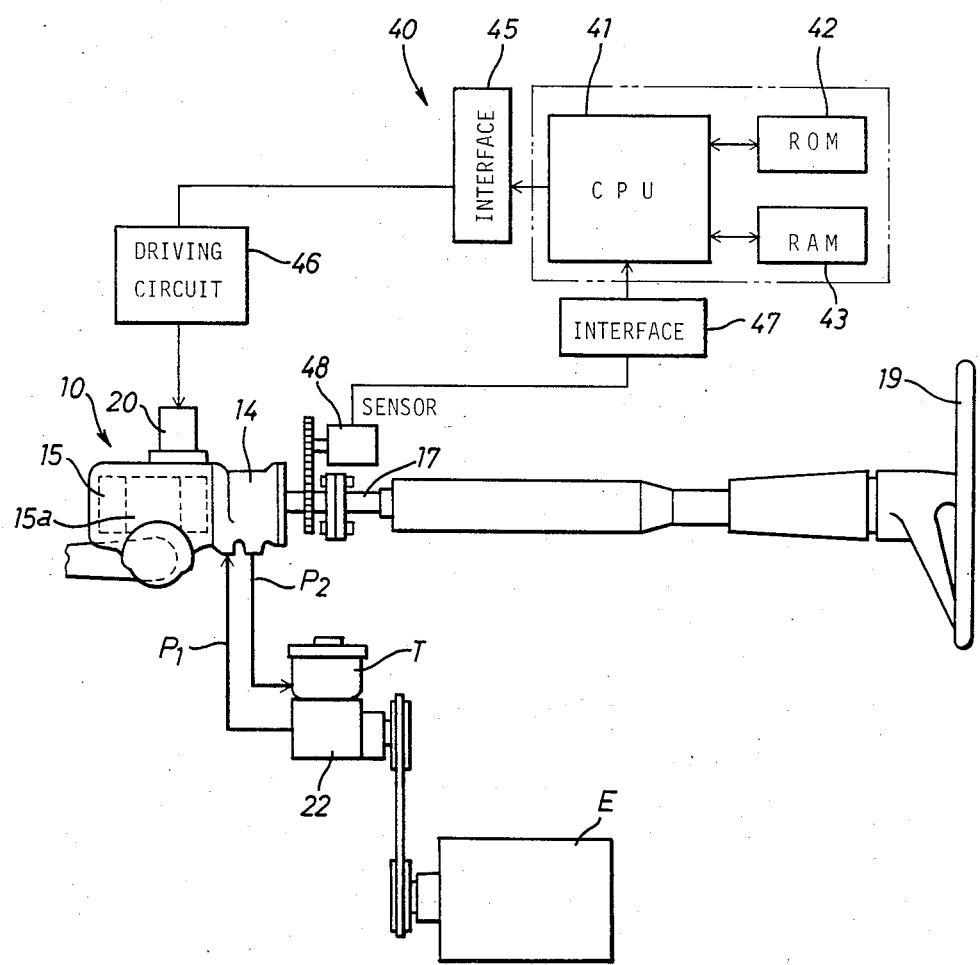
FIG. 1 is a schematic block diagram of an electric control apparatus for a power-assisted steering system in accordance with the present invention.

Referring now to the drawings, FIG. 1 illustrates a power-assisted steering system 10 in a wheeled vehicle which comprises a servo valve 14, a hydraulic cylinder 15, and a source of fluid under pressure in the form of a fluid pump 22 driven by a prime mover E of the vehicle. The servo valve 14 is associated with the hydraulic cylinder 15 in a common cylinder housing and is operatively connected to a steering shaft 17 which is arranged to be rotated by steering effort applied to a steering wheel 19. The servo valve 14 has an inlet port connected to the fluid pump 22 by way of a pressure conduit $P_1$ and an exhaust port connected to a fluid reservoir T of the pump 22 by way of an exhaust conduit $P_2$. The hydraulic cylinder 15 includes a power piston 15a mounted for reciprocating movement in the cylinder and operatively connected to steerable road-engaging wheels of the vehicle by way of a steering linkage (not shown). In such arrangement, the servo valve 14 interconnects the hydraulic cylinder 15 and the fluid pump 22 and is responsive to rotary motion of the steering shaft 17 to selectively direct the flow of fluid under pressure from the pump 14 to opposite fluid chambers of the cylinder 15 thereby to effect reciprocating movement of the power piston 15a.

Figure 2:
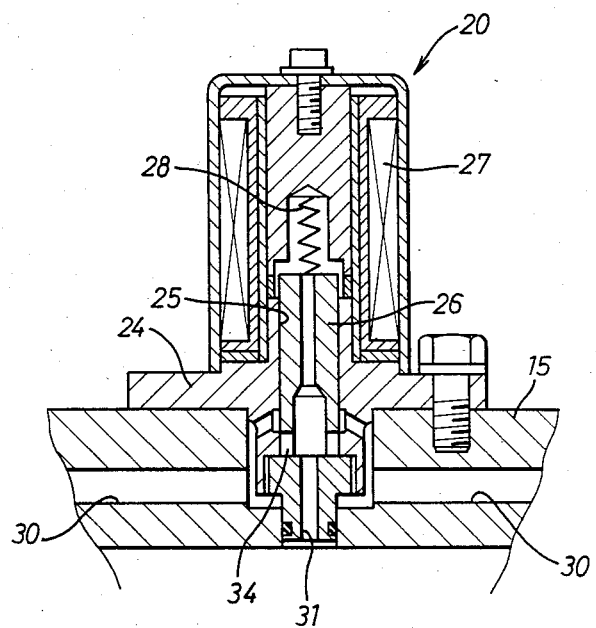
FIG. 2 is a sectional view of an electromagnetic control valve mounted on a cylinder housing shown in FIG. 1.

In the power-assisted steering system 10, an electromagnetic control valve 20 is mounted on the cylinder housing and disposed within a bypass passage 30, 31 between the opposite fluid chambers of hydraulic cylinder 15. As is illustrated in FIG. 2, the control valve 20 is of the normally closed type and comprises a main body 24 secured in a fluid-tight manner to the cylinder housing, a spool 26 axially movable in a bore 25 in main body 24, and a solenoid winding 27 in surrounding relationship with the spool 26. The spool 26 is loaded by a compression coil spring 28 downwards and normally positioned at its downward stroke end to interrupt fluid communication between sections 30 and 31 of the bypass passage respectively in open communication with the opposite fluid chambers of cylinder 15. When applied with a control current i as described in detail later, the solenoid 27 is energized to attract the spool 26 upwards in accordance with a value of the control current i such that the fluid communication between sections 30 and 31 of the bypass passage is established across radial slots 34 of spool 26 to provide bypass flow of fluid between the opposite fluid chambers of cylinder 15.

Figure 3:
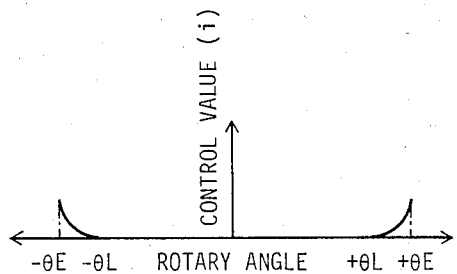
FIG. 3 is a graph illustrating a control pattern defining a relationship between a desired control value and rotary angle of a steering shaft.

As is illustrated in FIG. 1, the electromagnetic control valve 20 is connected to an electric control apparatus 40 which comprises a sensor 48 for indirectly detecting moving stroke of the power piston 15a, a computer including a central processing unit or CPU 41, a read-only memory or ROM 42 and a random access memory or RAM 43, and a driving circuit 46. The CPU 41 is connected to the sensor 48 through an interface 47 and connected to the driving circuit 46 through an interface 45. The sensor 48 is in the form of a potentiometer connected to the steering shaft 17 by means of a gear train to produce an output signal indicative of rotary angle $\theta$ of the steering shaft 17 which corresponds with moving stroke of the power piston 15a. The ROM 42 is arranged to memorize a control pattern illustrated in FIG. 3. This control pattern is designed to determine a desired control value (i) in relation to a value of the output signal from sensor 48. When the steering shaft 17 is rotated in a predetermined rotary extent of $-\theta L < \theta < +\theta L$, the value of the control value (i) is determined as zero. When the steering shaft 17 is rotated over the predetermined rotary extent, the control value (i) is determined to gradually increase in accordance with rotary motion of the steering shaft 17 to its rotary end $\pm \theta E$. In the actual practices of the present invention, the sensor 48 may be replaced with another sensor arranged to directly detect reciprocating movement of the power piston 15a in cylinder 15 so as to produce an output signal indicative of moving stroke of the power piston 15a. In such a case, the control pattern will be arranged to determine a control value (i) in relation to moving stroke of the power piston.

Hereinafter, the operation of the power-assisted steering system will be described. Assuming that the servo valve 14 is in its neutral position when the fluid pump 22 is driven by start of the prime mover E, the servo valve 14 is supplied with fluid from the pump 22 and permits the flow of fluid passing therethrough to the fluid reservoir T. Under such a neutral condition of the servo valve 14, the fluid pressure is maintained at a low level. When the steering shaft 17 is rotated by steering effort applied to the steering wheel 19, the servo valve 14 is actuated in response to rotary motion of the steering shaft 17 to establish fluid communication between the pressure passage $P_1$ and one of the opposite fluid chambers of cylinder 15 and to establish fluid communication between the exhaust conduit $P_2$ and the other fluid chamber of cylinder 15. Thus, the resulting pressure differential across the power piston provides a power assist to the operator's steering effort applied to the steering wheel 19 during turning maneuvers of the vehicle. When the steering shaft is rotated to its rotary end during turning maneuvers of the vehicle, the power piston in cylinder 15 moves to its stroke end, and instantaneously the fluid pressure tends to increase up to a relief pressure. In such a situation, the control valve 20 is energized under control of the electric control apparatus 40 as follows.

Figure 4:
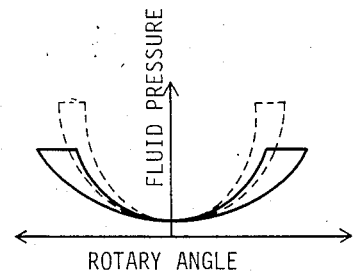
FIG. 4 is a graph illustrating fluid pressure applied to a hydraulic cylinder of the system in relation to rotary angle of the steering shaft.
Figure 5:
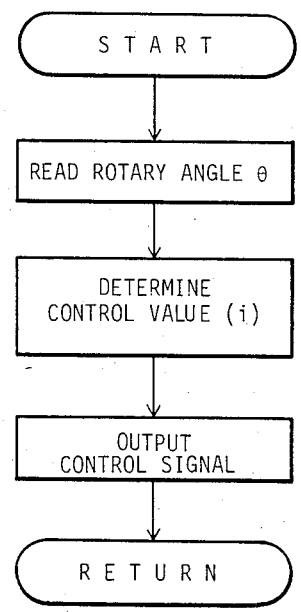
FIG. 5 is a flow chart for control of the electromagnetic control valve.

In operation of the steering wheel 19, the sensor 48 detects rotary motion of the steering shaft 17 to produce an output signal indicative of rotary angle $\theta$ of the steering shaft 17. The output signal from sensor 48 is applied to the CPU 41 through interface 47 and temporarily memorized in the RAM 43, while the control program of FIG. 5 is initialized in response to start of the prime mover E. When the program proceeds to a step 100, the rotary angle $\theta$ of the steering shaft 17 is read out from the RAM 43 and memorized in a buffer register. At the following step 101 of the program, the CPU 41 searches the control pattern of FIG. 3 to determine a control value (i) in relation to the memorized rotary angle $\theta$ and applies a control signal indicative of the control value (i) at a step 102 of the program to the driving circuit 46 through interface 45. Thus, the driving circuit 46 produces a control current i in response to the control signal from the CPU and applies it to the solenoid winding 27 of control valve 20. Assuming that the steering shaft 17 is rotated in the predetermined rotary extent during execution of the program, the control value (i) is determined as zero. Under such a condition, the driving circuit 46 does not produce any control current so that the solenoid winding 27 is maintained in its deenergized condition. When the steering shaft 17 is rotated over the predetermined rotary extent, the control value (i) is determined to gradually increase in accordance with rotary motion of the steering shaft 17 to its rotary end. As a result, the solenoid winding 27 of control valve 20 is energized by the control current i for driving circuit 46 to attract the spool 26 upwards against spring 28. This establishes fluid communication between sections 30 and 31 of the bypass passage across the radial slots 34 of spool 26 to provide bypass flow of fluid between the opposite fluid chambers of cylinder 15. Thus, as shown by solid lines in FIG. 4, the relief pressure of the pump 22 is regulated lower than that in conventional power-assisted steering systems, and rapid increase of the pump load is restrained to ensure stable operation of the prime mover.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. For example, the electromagnetic control valve 20 may be disposed within a bypass passage between the pressure conduit $P_1$ and the exhaust conduit $P_2$. It is to be understood, therefore, that within the scope of the appended claims, the invention may be practiced otherwise than as specifically set forth herein.

What is claimed is:

1. A control apparatus for a power-assisted steering system in a wheeled vehicle including a steering shaft arranged to be rotated by steering effort applied thereto; a source of fluid under pressure in the form of a fluid pump driven by a prime mover of the vehicle; a hydraulic cylinder having a power piston mounted for reciprocating movement in said cylinder and operatively connected to driven members of the steering system; and a servo valve interconnecting said fluid pump and said cylinder and being responsive to rotary motion of said steering shaft for selectively directing the flow of fluid under pressure from said fluid pump to one of opposite fluid chambers of said cylinder and permitting the flow of fluid from the other fluid chamber to a fluid reservoir to effect reciprocating movement of said power piston;

the control apparatus comprising:

an electrically operated control valve of normally closed type disposed within a bypass passage for providing bypass flow of fluid passing therethrough from said fluid pump to said reservoir in its energized condition;

a sensor for detecting rotary motion of said steering shaft to produce an output signal indicative of rotary angle of said steering shaft corresponding with a moving stroke of said piston;

a computer arranged to memorize a control pattern defining a relationship between a desired control valve and rotary angle of said steering shaft and programmed to determine the desired control value in response to the output signal from said sensor on a basis of the control patter and to produce a control signal indicative of the desired control value when a value of said output signal reaches a predetermined value indicative of approach of said steering shaft to its rotary end; and means for energizing said control valve in response to the control signal in such a way to increase the opening degree of said control valve in accordance with the value of the control signal wherein said means for energizing said control valve is a driving circuit responsive to the control signal from said computer for producing a control current indicative of the desired control valve and applying it to said control valve.

2. A control apparatus according to claim 1, wherein said electrically operated control valve is an electromagnetic control valve of the normally closed type mounted on the housing of said hydraulic cylinder and disposed within a bypass passage between the opposite fluid chambers of said cylinder.

3. A control apparatus for a power-assisted steering system in a wheeeled vehicle including a steering shaft arranged to be rotated by steering effort applied thereto; a source of fluid under pressure in the form of a fluid pump driven by a prime mover of the vehicle; a hydraulic cylinder having a power piston mounted for reciprocating movement in said cylinder and operatively connected to driven members of the steering system; and a servo valve interconnecting said fluid pump and said cylinder and being responsive to roatry motion of said steering shaft for selectively directing the flow of fluid under pressure from said fluid pump to one of opposite fluid chambers of said cylinder and permitting the flow of fluid from the other fluid chamber to a fluid reservoir to effect reciprocating movement of said power piston;

the control apparatus comprising:

an electrically operated control valve of the normally closed type disposed within a bypass passage for providing bypass flow of fluid passing therethrough from said fluid pump to said reservoir in its energized condition;

detecting means for detecting the reciprocating movement of said power piston to produce an output signal indicative of moving stroke of said power piston;

means responsive to the output signal from said detecting means for producing a control signal when a value of the output signal reaches a predetermined value indicative of approach of said power piston to its stroke end; and means for energizing said control valve in response to the control signal in such a way to increase the opening degree of said control valve in accordance with the value of the control signal;

wherein said detecting means comprises a sensor for detecting rotary motion of said steering shaft to produce an output signal indicative of rotary angle of said steering shaft corresponding with moving stroke of said power piston;

wherein said means responsive to the output signal from said detecting means comprises a computer arranged to memorize a control pattern defining a relationship between a desired control value and rotary angle of said steering shaft and programmed to determine the desired control value in response to the output signal from said sensor on a basis of the control pattern and to produce a control signal indicative of the desired control value when a value of said output signal reaches a predetermined value indicative of approach of said steering shaft to its rotary end.

4. A control apparatus according to claim 3, wherein said means for energizing said control valve is a driving circuit responsive to the control signal from said computer for producing a control current indicative of the desired control value and applying it to said control valve.

* * * * *